S. J. RICE.
HARVESTING MACHINE.
APPLICATION FILED MAR. 8, 1912. RENEWED AUG. 12, 1913.

1,073,819.

Patented Sept. 23, 1913.
4 SHEETS—SHEET 1.

Witnesses

Inventor
S. J. Rice,
By
Attorneys

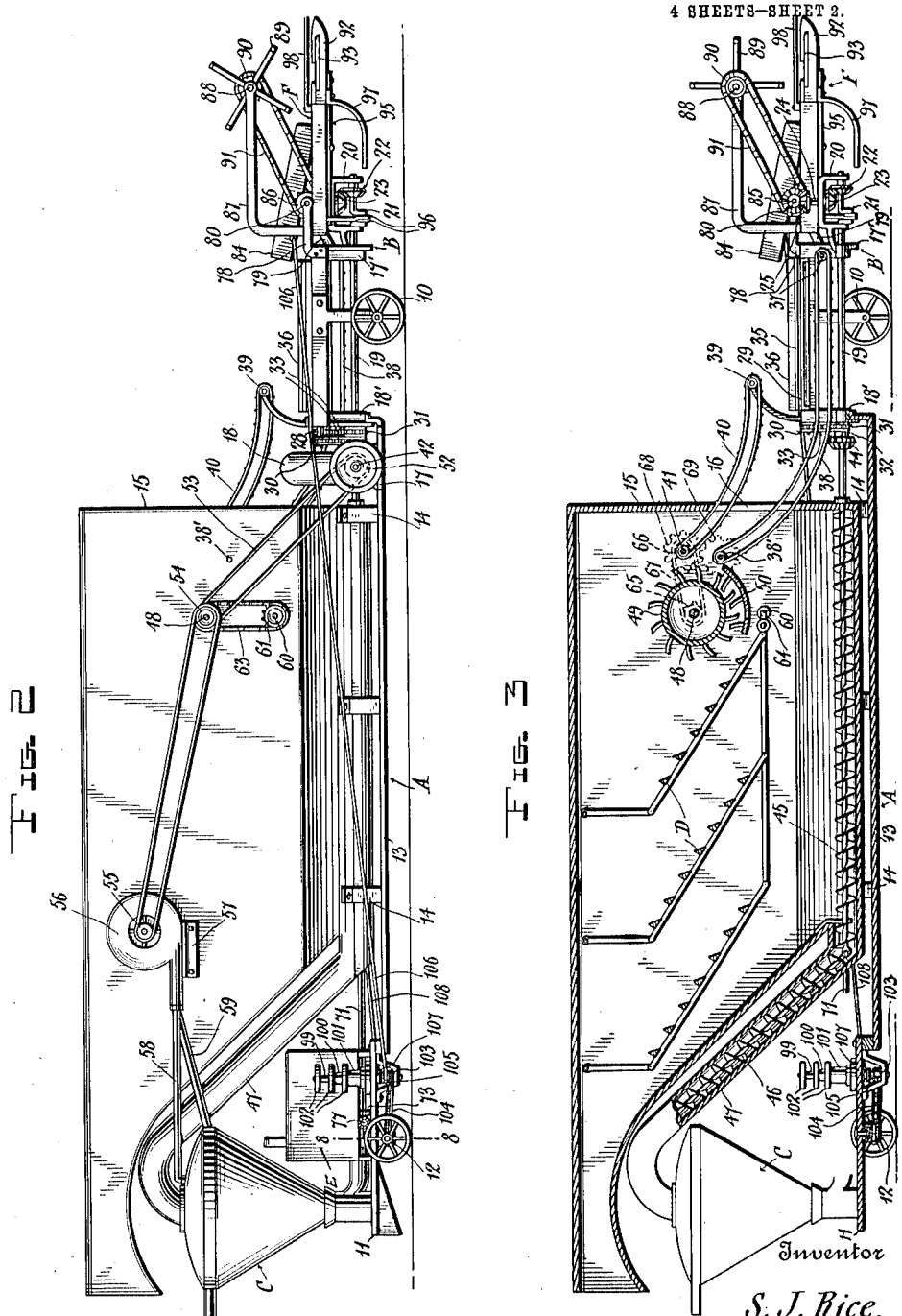

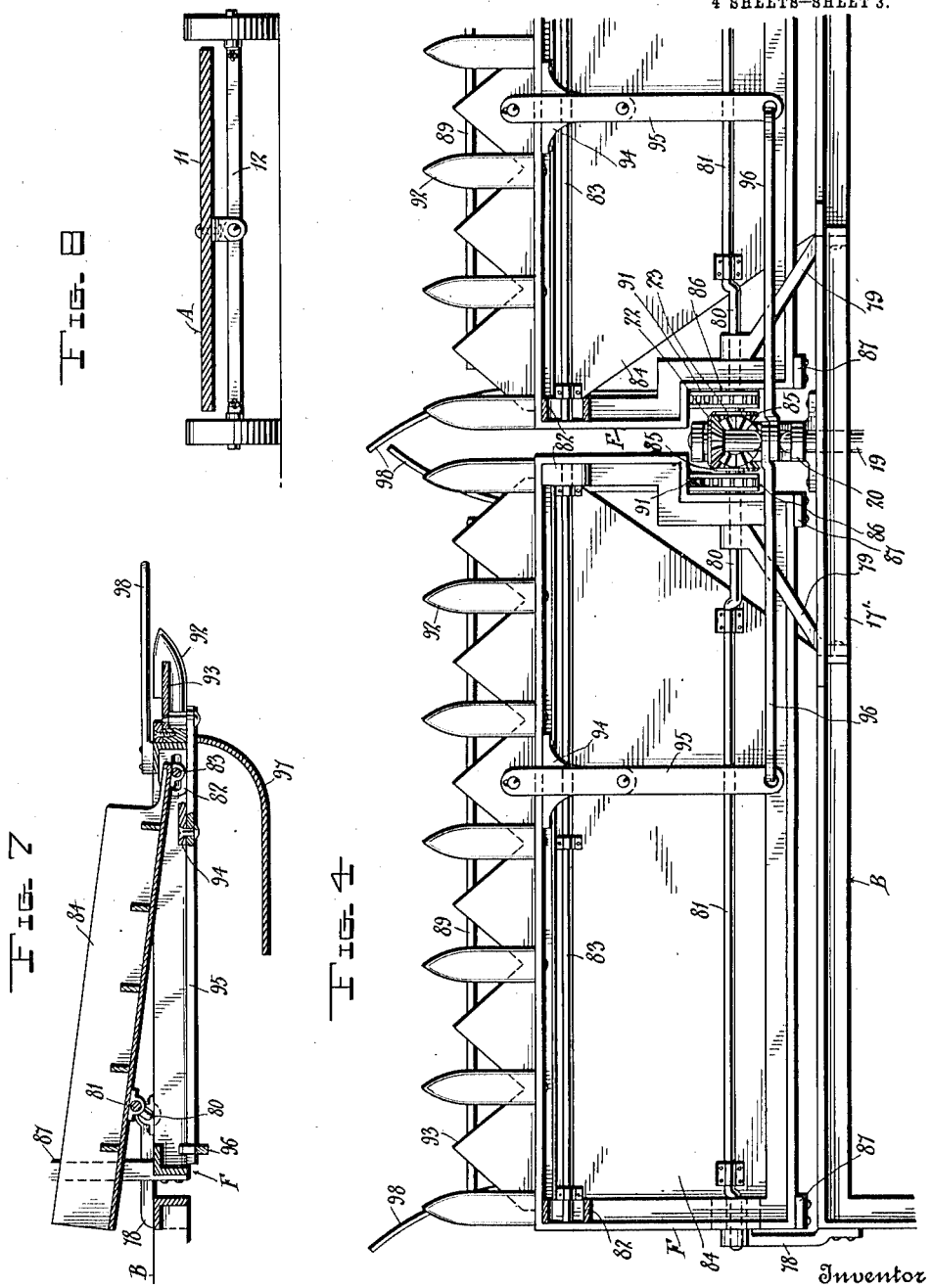

S. J. RICE.
HARVESTING MACHINE.
APPLICATION FILED MAR. 8, 1912. RENEWED AUG. 12, 1913.

1,073,819.

Patented Sept. 23, 1913.

4 SHEETS—SHEET 4.

Witnesses

Inventor
S. J. Rice,

By
Attorneys

UNITED STATES PATENT OFFICE.

SAMUEL J. RICE, OF LOMA, NORTH DAKOTA.

HARVESTING-MACHINE.

1,073,819.   Specification of Letters Patent.   Patented Sept. 23, 1913.

Application filed March 8, 1912, Serial No. 682,394. Renewed August 12, 1913. Serial No. 784,439.

*To all whom it may concern:*

Be it known that I, SAMUEL J. RICE, a citizen of the United States, residing at Loma, in the county of Cavalier, State of North Dakota, have invented certain new and useful Improvements in Harvesting-Machines; and I do hereby declare the following to be a full, clear, and exact description of the invention, such as will enable others skilled in the art to which it appertains to make and use the same.

This invention relates to harvesting machines.

The object of the invention resides in the provision of a harvesting machine which includes a wheel frame upon which is mounted a mowing or cutting mechanism, a threshing mechanism, a separator, and a bag filling and tying mechanism all arranged to receive the product being treated in succession from the mowing mechanism so as to obviate the successive handling of the product being harvested as is now the case.

A further object of the invention resides in so connecting the various mechanisms of the machine with a common motor, also mounted upon the wheeled frame, that the operation of said motor will simultaneously operate all of the mechanism.

A still further object of the invention resides in the provision of a certain improved detail construction with respect to the mowing mechanism as will hereinafter appear.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1:
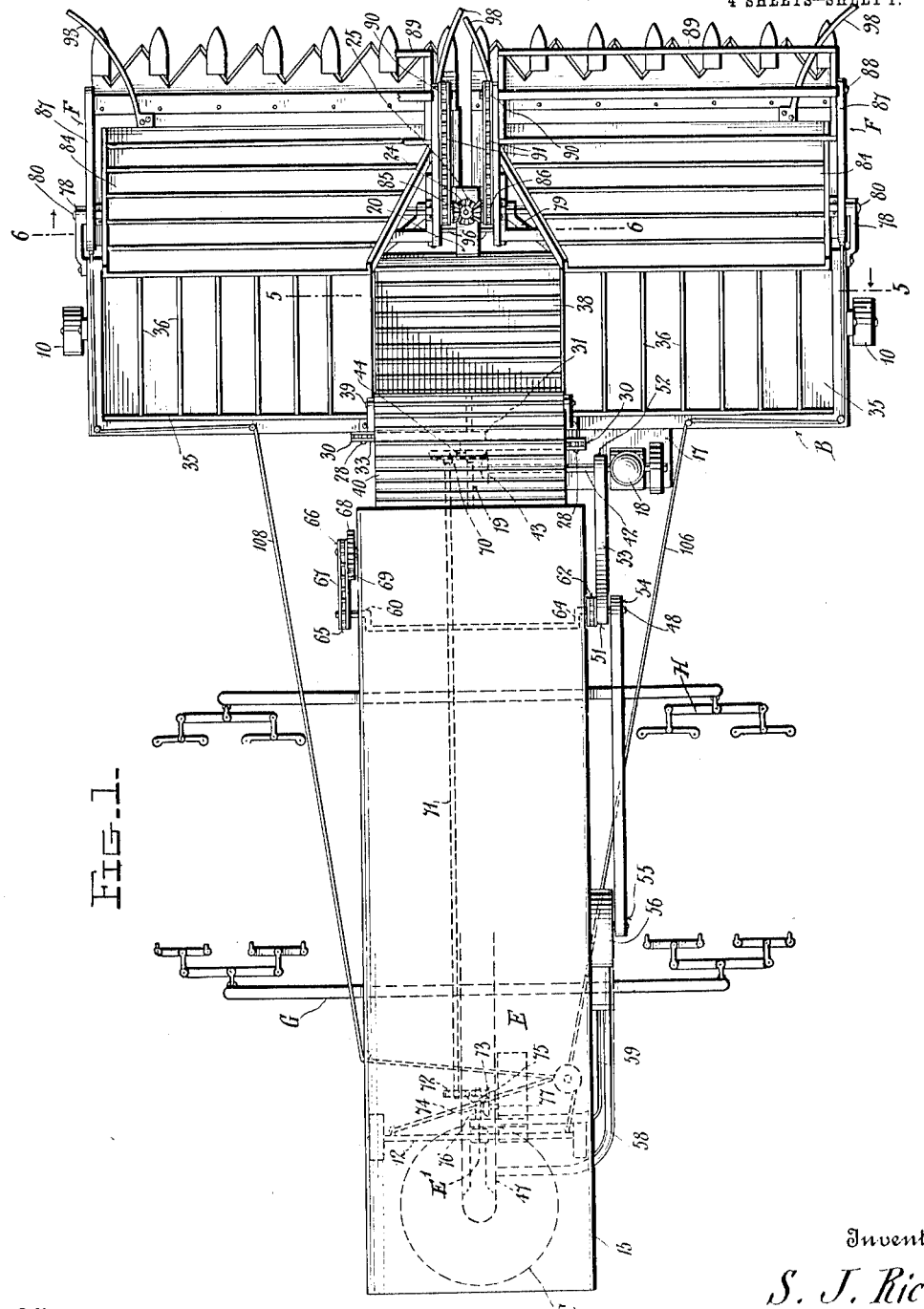
Figure 5:
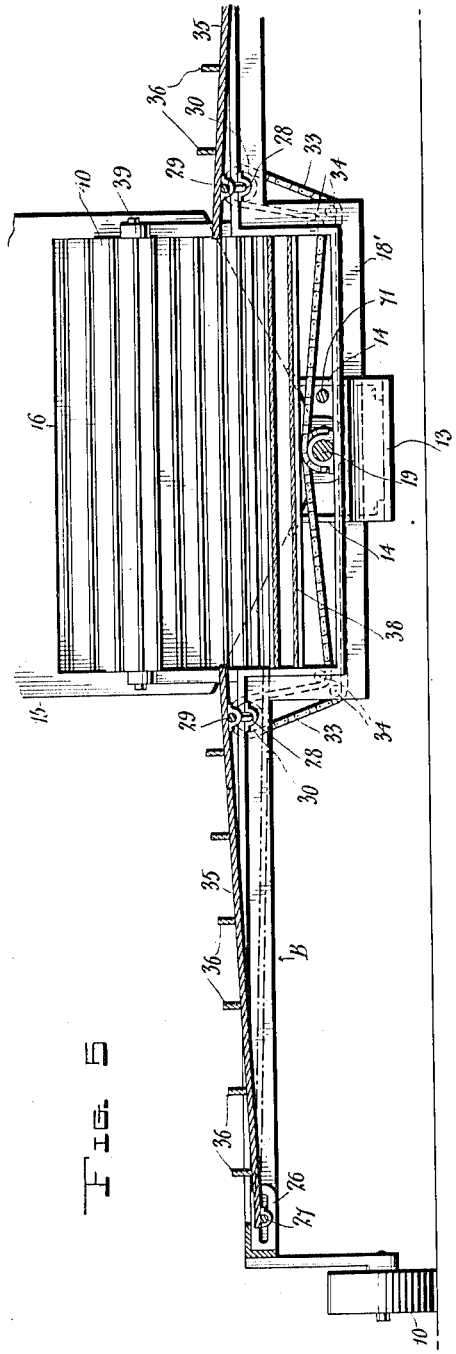
Figure 6:
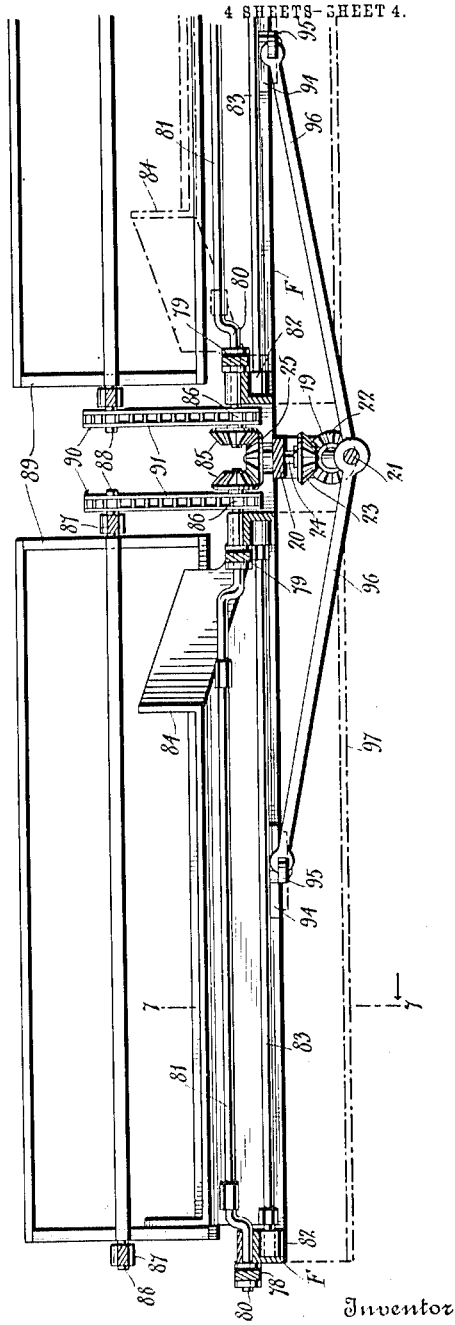

Figure 1 is a plan view of a machine constructed in accordance with the invention, with certain parts shown in dotted lines, Fig. 2, a side elevation of the machine, Fig. 3, a vertical longitudinal section through the machine, Fig. 4, a bottom view of a portion of the mowing mechanism of the machine, same being shown on an enlarged scale relatively to the same mechanism in Fig. 1, Fig. 5, an enlarged section on the line 5—5 of Fig. 1, Fig. 6, an enlarged section on the line 6—6 of Fig. 1, Fig. 7, a section on the line 7—7 of Fig. 6, and Fig. 8, a section on the line 8—8 of Fig. 2, same being on an enlarged scale.

Referring to the drawings the inventio. is shown as comprising a body A, the forward portion of which is formed of a frame B supported at each side by wheels 10. The rear portion of the body A is formed of a platform 11 supported upon a wheeled axle 12 to which latter it is pivotally connected so as to permit said axle to swing vertically and horizontally, the last named movement of the axle being utilized in steering the machine during its operation as will hereinafter appear. The frame B and the platform 11 are connected together by a beam 13 provided at spaced points with brackets 14 which support the housing 15 of the threshing mechanism, said housing being provided with an opening 16 in its forward end for a purpose that will presently appear. The beam 13 is provided at its forward end with a lateral extension 17 upon which is mounted a motor 18, shown in this instance as of the explosive type. The front and rear members of the frame B are provided centrally with depending U-shaped portions 17′ and 18′ respectively and journaled in suitable brackets on the horizontal arms of these U-shaped portions is a shaft 19, the inner end of which is journaled in the front end of the housing 15, while the outer end of said shaft 19 is journaled between the arms of a U-shaped bracket 20, said bracket projecting forwardly from the U-shaped portion 17′ and by which latter it is suitably supported. The shaft 19 between the arms of the U-shaped bracket 20 is provided with a crank portion 21 and also has fixed thereon outwardly of said crank portion a beveled gear 22 which meshes with a beveled gear 23 fixed on the lower end of a vertical shaft 24 journaled in the bracket 20. This shaft 24 also has fixed on its upper end a beveled gear 25 to be hereinafter referred to.

Mounted on the inner face of the front and rear members of the frame B at each end of said members is a slotted plate 26 and slidably mounted in these plates respectively at corresponding ends of the frame B are the ends of a rod 27. Journaled in the front and rear members of the frame B at each side of the U-shaped portions 17′ and 18' is a shaft 28 provided with a crank portion 29. Each of the shafts 28 has one end extended beyond the rear member of the frame B and fixed on this extension is a sprocket wheel 30. Fixed on the shaft 19 in line with the sprocket wheels 30 respectively are sprocket wheels 31 and 32 and traveling on the sprocket wheels 31 and 32 and respective sprocket wheels 30 are sprocket chains 33 which are suitably guided in their movements by studs 34 projecting from the U-shaped portion 18' of the frame B. Pivotally supported upon each of the rods 27 is the outer end of a feeding tray 35, the inner ends of these trays 35 being rotatably supported upon respective crank portions 29 of the shafts 28. Each of the trays 35 is provided with a plurality of spaced ribs 36 which extend longitudinally of the machine. Journaled between the vertical arms of the U-shaped portion 17' of the frame B is a shaft 37 which supports one end of an endless conveyer 38. This conveyer extends through the opening 16 of the thresher housing and has its other end supported upon the shaft 38' journaled between the sides of said housing. Journaled between brackets 39 supported upon the rear member of the frame B at each side of the U-shaped portion 18' is a shaft 39 which supports one end of an endless conveyer 40 said conveyer extending through the opening 16 of the thresher housing and having its other end supported upon a shaft 41 journaled between the sides of the thresher housing. The drive shaft of the motor 18 is indicated at 42 and has fixed on its inner end a gear 43 which meshes with a gear 44 fixed on the shaft 19. This shaft 19 extends longitudinally of the thresher housing and has mounted thereon a conveyer screw 45. The end of the shaft 19 disposed within the housing 16 is connected by a universal joint with the shaft of a conveyer screw 46 disposed in a spout 47, which spout communicates at one end with the interior of the thresher housing and at its other end with a grain separator C mounted upon the platform 11, which separator is specifically described and claimed in my co-pending application, filed Feb. 8, 1912 and serially numbered 676,247. Journaled within the housing 15 adjacent the inner ends of the conveyers 38 and 40 is a shaft 48 which carries the usual thresher cylinder 49 and associated with this cylinder is the usual concave 50. The shaft 48 has its ends extended through the sides of the housing 15 respectively and fixed on the terminal of this shaft adjacent the motor 18 is a belt wheel 51 which alines with a belt wheel 52 fixed on the motor shaft 42. These belt wheels 51 and 52 are operatively connected by means of a belt 53. Also fixed on the terminal of the shaft 48 adjacent the motor 18 and outwardly of the belt wheel 51 is another belt wheel 54 which alines with a belt wheel 55 fixed on the shaft of a fan 56 supported upon a bracket 57 carried by the housing 15. This fan 56 is operatively connected to the separator C by means of pipes 58 and 59, the former of which discharges vertically and the latter transversely of the separator. Journaled between the sides of the housing 15 beneath the shaft 48 is another shaft 60 and the end of this shaft adjacent the motor 18 is extended through the housing 15 and has fixed thereon a sprocket wheel 61 which alines with a sprocket wheel 62 fixed on the adjacent end of the shaft 48. Traveling on the sprocket wheels 61 and 62 is a sprocket chain 63. The shaft 60 is provided within the housing 15 with crank portions 64 which portions are operatively connected with a shaking screen D so that the rotation of the shaft 60 will effect an oscillation of said shaking screen. Fixed on the end of the shaft 48 remote from the engine 18 is a sprocket wheel 65 which alines with a sprocket wheel 66 fixed on the adjacent end of the shaft 41 and traveling on the sprocket wheels 65 and 66 is a sprocket chain 67. Fixed on the shaft 41 just inward of the sprocket wheel 66 is a gear 68 which meshes with a gear 69 fixed on the adjacent end of the shaft 38'. Meshing with the gear 44 is a gear 70 fixed on a shaft 71 journaled longitudinally of the housing 15 and disposed throughout the greater portion of its length within said housing. This shaft 71 extends through the rear wall of the housing 15 and has fixed on the end thereof adjacent the separator C a gear 72 which meshes with a gear 73 fixed on an extension 74 of the shaft of the discharge screw conveyer of said separator. This extension 74 passes through the casing of an elevator shown typically at E' and serves to operate said elevator to deliver the grain supplied thereto from the separator to a bag tying mechanism shown typically at E, said mechanism being described and claimed in my co-pending application filed Feb. 8, 1912 and serially numbered 676246. Also fixed on the shaft extension 74 is a beveled gear 75 which meshes with a beveled gear 76 fixed on a shaft 77 forming a component part of the bag tying mechanism E and through the rotation of which shaft 77 said bag tying mechanism is operated.

Mounted at each end of the frame B are forwardly extending brackets 78 while additional forwardly extending brackets 79 are mounted on the front member of the frame B adjacent the sides of the U-shaped portion 17'. Journaled in adjacent brackets 78 and 79 are shafts 80 provided with intermediate crank portions 81 for a purpose that will presently appear. Loosely mounted on each of the shafts 80 is a frame F.

Mounted on the inner faces of the side members of each frame F at the forward end of said side members are slotted plates 82 and slidably mounted in the slots of the plates 82 carried by the said frame F are the terminals of a rod 83 upon which is rotatably supported the outer end of a feeding tray 84. The bottom of this tray 84 is rotatably supported adjacent its inner end upon the crank portion 81 of the shaft 80. Fixed on the inner end of each of the shafts 80 is a beveled gear 85 which meshes with the beveled gear 25 fixed on the upper end of the shaft 24. Fixed on each shaft 80 just inward of the beveled gear 85 is a sprocket wheel 86 for a purpose that will presently appear. Supported at the rear of each end of respective frame F are angle brackets 87 one arm of which extends forward of and parallel to its supporting frame. Journaled in each pair of brackets 87 carried by a given frame F is a shaft 88 upon which is fixed a beater 89. Fixed on the inner ends of respective shafts 88 are sprocket wheels 90 which aline respectively with the sprocket wheels 86 and traveling on alined sprocket wheels 86 and 90 are sprocket chains 91. Carried by the forward members of each of the frames F is a finger bar 92 and in each of said finger bars is slidably mounted a cutter 93 in the usual and well known manner. Projecting inwardly from the forward member of each frame F is a bracket 94 upon which is centrally pivoted a lever 95, the outer end of said lever being in turn pivotally connected in a suitable manner to the under face of the cutter 93 while the inner end thereof is connected by a pitman 96 to the crank portion 21 of the shaft 19. Each of the finger bars 92 carries depending rests 97 which serve to support the finger bar in proper relation to the grain being harvested. Mounted on the upper side of the front member of each frame F adjacent the ends of said member respectively are forwardly diverging guide fingers 98 which serve to properly direct the grain upon respective trays 84 after same has been cut by respective knives 93.

Mounted upon the platform 11 is a plurality of telescopically arranged rotatable shafts 99, 100 and 101 each of which is provided at its upper end with a suitable hand wheel 102 whereby a given shaft may be manually rotated. The lower end of the shaft 99 has fixed thereon a sprocket wheel 103 over which travels a sprocket chain 104 the terminals of which are connected to respective ends of the axle 12. By this construction it will be apparent that upon the rotation of the shaft 99 the axle 12 may be swung in a horizontal plane to effect the steering of the machine. The lower end of the shaft 100 is disposed above the sprocket wheel 103 and terminates in a drum portion 105 upon which is adapted to be wound and unwound a cable 106. This cable is directed forwardly of the machine over suitable guide pulleys and has its forward end secured to the vertical arm of an angle bracket 87 disposed at the outer end of one of the frames F. By this construction it will be apparent that through the rotation of the shaft 100 the forward end of one of the frames F may be moved up and down so as to position the knife 93 in and out of cutting relation to the grain. The lower end of the shaft 101 is disposed above the drum portion 105 of the shaft 100 and also terminates in a drum portion 107 upon which is adapted to be wound and unwound a cable 108. This cable 108 is directed forwardly of the machine over suitable guide pulleys and has its forward end secured to the vertical arm of an angle bracket 87 disposed at the outer end of the frame F, which is located on the opposite side of the machine from the frame F which carries the angle bracket 87 connected to the cable 106. By this construction it will be apparent that either of the frames F may be swung on their pivots so as to elevate and lower their forward ends and thereby control the position of the knives 93 relatively to the grain being harvested.

The machine as a whole is adapted to be moved along the ground by means of draft animals suitably harnessed to draft connections G operatively secured to the beam 13. The heads of the animal are adapted to be held in proper relation to the machine by means of a multiple yoke structure H also operatively secured to the beam 13 forward of the draft connections G.

Assuming that the machine is being drawn along the ground by suitable draft animals and that the motor 18 is running the operation of the cutting element of the machine is as follows. The rotation of the engine shaft 42 is imparted through the gears 43 and 44 to the shaft 19 and the rotation of this shaft 19 through the medium of the pitmen 96 and levers 95 will reciprocate the knives 93 to effect the cutting of the grain. The rotation of this shaft 19 is also imparted through the beveled gears 22, 23, 25 and 85 to the shafts 80 and the rotation of these shafts 80 will, through the medium of the sprocket wheels 86, sprocket chains 91 and sprocket wheels 90 rotate the shafts 88 and the beaters 89. The rotation of these beaters 89 will throw the cut grain upon respective trays 84, which latter are reciprocated by reason of their respective connections with the crank portions 81 of the shafts 80, the inner ends of said trays moving up on their rearward stroke and down on their forward stroke as will be apparent. The movement of these trays 84 serves to constantly work the grain toward the rear of the machine until it is eventually delivered over the inner ends of said trays upon respective trays 35. These trays 35 have a movement transversely of the machine similar to the longitudinal movement of the trays 34, the inner ends of said trays 35 rising on their instroke and descending on their out stroke. This movement of the trays 35 is effected by the connections between the shafts 28 and 19 afforded by the sprocket chains 33. The movement of the trays 35 will constantly deliver the grain to the elevator 38 which in coöperation with the elevator 40 conveys the grain to the thresher cylinder 49 as will be apparent. The operation of the cylinder 49 and the conveyers 38 and 40 is had by means of suitable connections between same and the engine shaft 42. Should it be desired to elevate the forward end of the frame F on the right of the machine it is only necessary to wind the cable 106 on the drum 105 by the rotation of shaft 100. If it is desired to elevate the forward end of the frame F disposed on the left of the machine it is only necessary to wind the cable 108 upon the drum 107 by the rotation of the shaft 101. From the threshing cylinder the grain is discharged through the screen D to the bottom of the housing 15 from whence it is carried by the conveyer screw 45 through the spout 47 and discharged into the separator C in which it is efficiently cleaned. From this separator the cleaned grain is conveyed to a suitable elevator and discharged therefrom to the bag filling and tying mechanism E from which the grain filled bags are successively delivered upon the ground.

What is claimed is:

1. In a harvesting machine, the combination of a wheeled body, a plurality of independent cutting mechanisms supported by the body and means for actuating same, a plurality of feeding trays adapted to receive material from said cutting mechanisms respectively, means for reciprocating said feeding trays longitudinally of the body, a plurality of feeding trays adapted to receive material from said first named feeding trays respectively, means for reciprocating said second named feeding trays transversely of the body, and a conveyer adapted to receive material from all of said second named feeding trays.

2. In a harvesting machine the combination of a wheeled body, a threshing mechanism supported thereby, a plurality of independent cutting mechanisms supported by the body, a plurality of feeding trays adapted to receive material from said cutting mechanisms respectively, means for reciprocating said feeding trays longitudinally of the body, a plurality of feeding trays adapted to receive material from said first named feeding trays respectively, means for reciprocating said second named feeding trays transversely of a body, a conveyer receiving material from all of said second named feeding trays and delivering to said threshing mechanism, a motor supported by said body and connections between said motor and the cutting mechanisms, feeding trays, conveyer and threshing mechanism.

3. In a harvesting machine, the combination of a wheeled body, a plurality of independent cutting mechanisms supported by the body, a plurality of reciprocating feeding trays adapted to receive material from said cutting mechanisms respectively, a plurality of beaters rotatably mounted in position to move the material from the cutting mechanisms respectively to respective feeding trays, and means for simultaneously operating said cutting mechanisms, feeding trays and beaters.

4. In a harvesting machine, the combination of a wheeled body, a plurality of cutting mechanisms mounted upon said body for vertical movement, means for independently moving said cutting mechanisms up and down, a plurality of feeding trays adapted to receive material from said cutting mechanisms respectively, a plurality of beaters rotatably mounted in position to move the material from the cutting mechanisms respectively to respective feeding trays, and means for simultaneously operating said cutting mechanisms, feeding trays and beaters.

5. In a harvesting machine, the combination of a wheeled body, a plurality of cutting mechanisms, a plurality of feeding trays adapted to receive material from said cutting mechanisms respectively, means for reciprocating said feeding trays longitudinally of the body and for simultaneously moving one end of each of said feeding trays up and down during such reciprocation, a plurality of feeding trays adapted to receive material from said first named feeding trays respectively, means for reciprocating said second named feeding trays transversely of the body and for simultaneously moving one end of each of said second named feeding trays up and down during their reciprocation, and a conveyer adapted to receive material from all of said second named feeding trays.

In testimony whereof I affix my signature in presence of two witnesses.

SAMUEL J. RICE.

Witnesses:
 WILLIAM HEAPY,
 E. E. BUTCHART.